United States Patent
Molander et al.

(10) Patent No.: US 8,812,002 B2
(45) Date of Patent: Aug. 19, 2014

(54) ACQUISITION OF INFORMATION FOR A RADIO ACCESS NETWORK

(75) Inventors: Anders Molander, Linköping (SE); Paul Schliwa-Bertling, Ljungsbro (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 13/520,386

(22) PCT Filed: Jun. 4, 2012

(86) PCT No.: PCT/SE2012/050591
§ 371 (c)(1),
(2), (4) Date: Jul. 3, 2012

(87) PCT Pub. No.: WO2013/006117
PCT Pub. Date: Jan. 10, 2013

(65) Prior Publication Data
US 2013/0072195 A1    Mar. 21, 2013

Related U.S. Application Data

(60) Provisional application No. 61/505,258, filed on Jul. 7, 2011.

(51) Int. Cl.
*H04W 36/00* (2009.01)
(52) U.S. Cl.
USPC .......................................... 455/437; 455/436
(58) Field of Classification Search
CPC ..................... H04W 36/0066; H04W 36/0061
USPC ................................................ 455/436, 437
See application file for complete search history.

(56) References Cited

U.S. PATENT DOCUMENTS

2009/0275325 A1*  11/2009  Davis ........................ 455/422.1

OTHER PUBLICATIONS

International Search Report and Written Opinion, mailed Sep. 21, 2012, in International Application No. PCT/SE2012/050591.
Huawei Technologies Co., Ltd: "Improvement of System Information Acquisition", 3GPP Draft; GP-081386 Improvement of SI Acquisition, 3GPP TSG GERAN No. 39, Aug. 28, 2008, XP050413811, Sections 1-4.

(Continued)

*Primary Examiner* — Barry Taylor
(74) *Attorney, Agent, or Firm* — Nixon & Vanderhye P.C.

(57) ABSTRACT

There is provided an information acquisition method to be executed by a mobile station, connected to a first radio access network of a first radio access technology, to perform acquisition of an information set related to a second radio access network of a second, different radio access technology for enabling mobility to the second radio access network. Basically, the method comprises receiving (S1) message instances, wherein a set of the message instances includes the information set for enabling mobility to the second radio access network. The method further comprises investigating (S2) the message instances to find counter information in a message instance indicating the number of message instances the mobile station must acquire to assemble the information set. The method also comprises identifying (S3), in relation to the message instance in which the counter information is found, the set of message instances that includes the information set based on the counter information. The method then comprises collecting (S4) the information set from the identified set of message instances.

33 Claims, 10 Drawing Sheets

(56) References Cited

OTHER PUBLICATIONS

Huawei Technologies Co. Ltd: "Improvement of System Information Acquisition", 3GPP Draft; GP-081021 Improvement of SI Acquisition, 3GPP TSG GERAN No. 39, Aug. 20, 2008, XP050413501, Sections 1 and 3.

Nokia Corporation et al: "Improved E-UTRAN System Information Acquisition", 3GPP Draft; GP-080667, 3GPP TSG GERAN No. 38, May 7, 2008, XP050019960, Sections 1, 2, 3, 401 and 4.2.

Telefon AB LM Ericsson et al., "Discussion on Fast Acquisition of UTRAN System Information", 3GPP Draft; GP-111229 DP on Fast Acquisition of system Information, 3GPP. TSG GERAN No. 51, Aug. 24, 2011, XP050536819, Sections 2 and 4.

* cited by examiner

| UTRAN Information Set | | | | |
|---|---|---|---|---|
| 3G Neighbour Cell Description and Measurement Parameters Description<br>~~UTRAN_Start = 1~~<br>~~UTRAN_Stop = 0~~ | 3G Neighbour Cell Description continued | 3G Priority Parameters Description<br>E-UTRAN Parameters Description<br>UTRAN_Stop = 1 | E-UTRAN Parameters Description continued | E-UTRAN Parameters Description continued |
| Instance no 1<br>SI2quater_INDEX = 0 | Instance no 2<br>SI2quater_INDEX = 1 | Instance no 3<br>SI2quater_INDEX = 2 | Instance no 4<br>SI2quater_INDEX = 3 | Instance no 5<br>SI2quater_INDEX = 4 |

*Fig. 5*

| UTRAN Information Set | | | | |
|---|---|---|---|---|
| Measurement Parameters description NC Measurement Parameters | 3G Neighbour Cell Description and Measurement Parameters Description  UTRAN_Start = 1  UTRAN_Stop = 0 | 3G Neighbour Cell Description continued | 3G Priority Parameters Description E-UTRAN Parameters Description  UTRAN_NoOfSeg = 0011 | E-UTRAN Parameters Description continued |
| Instance no 1 SI2quater_INDEX = 0 | Instance no 2 SI2quater_INDEX = 1 | Instance no 3 SI2quater_INDEX = 2 | Instance no 4 SI2quater_INDEX = 3 | Instance no 5 SI2quater_INDEX = 4 |

Number of segments in the UTRAN Information Set = 3

*Fig. 6*

ACQUISITION OF INFORMATION FOR A RADIO ACCESS NETWORK

This application is the U.S. national phase of International Application No. PCT/SE2012/050591 filed 4 Jun. 2012 which designated the U.S. and claims priority to U.S. Provisional Application No. 61/505,258 filed 7 Jul. 2011, the entire contents of each of which are hereby incorporated by reference.

TECHNICAL FIELD

The present technology generally relates to procedures and structured functions used at the radio interface for Radio Resource management in radio access networks. In particular, the proposed technology concerns acquisition of an information set for enabling mobility to another radio access network of a different radio access technology, as well as preparation of such an information set.

BACKGROUND

Radio Resource (RR) management procedures typically include functions related to the management of the common transmission resources, e.g. the physical channels and the data link connections on control channels.

The purpose of Radio Resource procedures is normally to establish, maintain and/or release RR connections that allow a dialogue between the network and a mobile station (MS), or generally user equipment. This may include cell selection/reselection and handover procedures.

System information and similar information of different types are transmitted by the network on one or more control channels, normally regularly broadcast on the BCCH (Broadcast Control Channel). Based on this information the mobile station is able to decide whether and how it may gain access to the system via the current cell and to cells served by other Radio Access Technologies (RATs).

The Fast Acquisition of System Information procedure was introduced in 3GPP (3$^{rd}$ Generation Partnership Project) Release 8 with the intention of speeding up cell reselection based mobility for a multi-RAT (Radio Access Technology) capable mobile station, e.g. from GERAN (GSM/EDGE Radio Access Network) to UTRAN (Universal Terrestrial Radio Access Network) and/or from GERAN to E-UTRAN (Evolved Universal Terrestrial Radio Access Network).

FIG. 1 is a schematic diagram illustrating an example of mobility between two different RATs, here exemplified by GERAN and UTRAN. The GERAN network 20 normally comprises one or more BSCs (Base Station Controllers) 22 and one or more BTSs (Base Transceiver Stations) 24-1 and 24-2. The UTRAN network 30 normally comprises one or more RNCs (Radio Network Controllers) 32 and one or more NodeBs 34-1 and 34-2. The different Radio Access Technologies (RATs) may have overlapping radio coverage areas. Mobile Stations (MSs) 10 can have multi-RAT capabilities that enable mobility between the different RATs. The mobility is among others based on the input parameters broadcasted by the Radio Access Network (RAN), e.g. in GERAN in the System Information (SI) messages. In this example, the BSC 22 assembles the System Information message and after the assembly the SI message is transferred over the Abis link from the BSC 22 to the BTS 24-1. The BTS 24-1 normally transmits the SI message on the Broadcast Common Control Channel (BCCH) over the Um interface (GERAN radio interface). Mobile Stations 10 then acquire the SI message and apply it e.g. for inter-RAT cell re-selection to UTRAN.

In general, there may be a first radio access network of a first RAT and a second radio access network of a second different RAT, where a mobile station connected to the first radio access network needs to acquire information related to the second radio access network for enabling mobility to the second radio access network.

One specific example of a System Information message is the SI2quater message, as defined in 3GPP TS 44.018 section 9.1.34a ref [1]. In order to speed up cell reselection based mobility to another RAT, a multi RAT capable Mobile Station (MS) does not have to read all message instances of the SI2quater message. This is defined as the Fast Acquisition of System Information procedure and is defined in 3GPP TS 44.018 section 3.4.1.2.1.11, ref [1]. This procedure is to be applied by a multi RAT capable MS for UTRAN if the 3G Priority Parameters Description IE is present in the SI2quater message or 3G Supplementary Parameters Description IE is present in the MEASUREMENT INFORMATION message (ref [1]) or for E-UTRAN if the E-UTRAN Parameters Description IE is present in the SI2quater or MEASUREMENT INFORMATION messages.

From here on the SI2quater message is primarily discussed, however the same problems and the same proposed measures are also valid for the MEASUREMENT INFORMATION message and other similar information messages. The SI2quater message is generally denoted as a System Information message broadcasted to all mobile stations in idle mode camping in the cell while the MEASUREMENT INFORMATION message is a dedicated message sent on the Slow Associated Control Channel (SACCH) to a single MS.

In the definition of the Fast Acquisition of SI procedure, e.g. reference can be made to section 3.4.1.2.1.11 in 3GPP TS 44.018, ref [1], it is stated that the network shall ensure that UTRAN (respectively E-UTRAN) neighbour cell list, measurement parameters and possible priority information (priority information only provided in SI2quater message, i.e. not in MEASUREMENT INFORMATION message) are contained in consecutive instances of the SI2quater message together forming a UTRAN Information Set (respectively E-UTRAN Information Set). The first SI2quater message instance containing UTRAN (respectively E-UTRAN) neighbour cell list and/or measurement parameters and/or priority information shall contain a start bit, UTRAN_Start (respectively E-UTRAN_Start), indicating the start of the UTRAN Information Set (respectively E-UTRAN Information Set), while the last SI2quater message instance containing UTRAN (respectively E-UTRAN) neighbour cell list and/or measurement parameters and/or priority information shall contain a stop bit, UTRAN_Stop (respectively E-UTRAN_Stop), indicating the end of the UTRAN Information Set (respectively E-UTRAN Information Set).

By way of example, for UTRAN related information the UTRAN neighbour cell list and UTRAN measurement parameters are contained within two 3GPP pre-Release 5 structures (3G Neighbour Cell Description struct and 3G Measurement Parameters Description struct) in the SI2quater message while the UTRAN_Start and UTRAN_Stop bits are contained in the 3G Priority Parameters Description IE which is part of a 3GPP Release-8 extension in the SI2quater message.

To be able to build the SI2quater message and the UTRAN Information Set according to the procedural text in 3GPP TS 44.018 section 3.4.1.2.1.11, the network has to include the UTRAN_Start bit in the first instance of the SI2quater message containing UTRAN related information (i.e. UTRAN neighbour cell list and UTRAN measurement parameters) and the UTRAN_Stop bit in the last instance of the SI2quater message containing UTRAN related information (e.g. UTRAN priority information).

Presuming the network starts building the SI2quater message by including all pre-Release 5 related information including the complete (or part of) UTRAN Neighbour Cell list in the first instance of the message, this message instance also has to contain the Release-8 extension part in which the UTRAN_Start bit is set to "1" and the UTRAN_Stop bit is set to "0".

To be able to include this single bit of information (UTRAN_Start bit=1) in the first instance of the SI2quater message containing UTRAN related information (3G Neighbour Cell Description IE and 3G Measurement Parameters Description IE), the message has to include a number of overhead related bits preceding and following the UTRAN_Start bit. If e.g. starting from the Release 5 extension bit, this non-informative part of the message instance consists of 18 bits of Concrete Syntax Notification 1 (CSN.1) overhead as exemplified in the enclosed Table 1 (highlighted) included in Appendix 1. CSN.1 is a message encoding format used in the GERAN specifications. Please observe that only a part of the SI2quater message (SI2quater Rest Octets IE) is shown in the table.

Considering one instance of the SI2quater message may carry a maximum of 20 octets (see 3GPP TS 44.018 section 10.5.2.33b) of information, a "waste" of 2 octets as in the example above is really remarkable. This particular problem analysis with regard to the SI2quater message is in no way limiting the scope of the proposed technology, as readily understood by the skilled person.

There is in fact a general demand for more efficient mechanisms for supporting and performing acquisition of an information set for enabling mobility to another radio access network of a different radio access technology.

SUMMARY

It is a general object to provide improved acquisition of an information set for enabling mobility to another radio access network of a different radio access technology, as well as improved preparation of such an information set.

In a first aspect, there is provided an information acquisition method to be executed by a mobile station, connected to a first radio access network of a first radio access technology, to perform acquisition of an information set related to a second radio access network of a second different radio access technology for enabling mobility to the second radio access network. Basically, the method comprises receiving message instances, wherein a set of the message instances includes the information set for enabling mobility to the second radio access network. The method further comprises investigating the message instances to find counter information in a message instance indicating the number of message instances the mobile station must acquire to assemble the information set. The method also comprises identifying, in relation to the message instance in which the counter information is found, the set of message instances that includes the information set based on the counter information. The method then comprises collecting the information set from the identified set of message instances.

In a second aspect, there is provided an information acquisition method to be executed by a mobile station, connected to a first radio access network of a first radio access technology, to perform acquisition of an information set related to a second radio access network of a second different radio access technology for enabling mobility to the second radio access network. The method comprises receiving message instances, wherein a set of said message instances includes the information set for enabling mobility to the second radio access network. The method further comprises investigating an index field, included in each message instance, to determine whether the received message instance is the first message instance and determining whether there is any information related to the second radio access network of a second different radio access technology in the first message instance to thereby determine the start of the information set. The method also comprises identifying the set of message instances that includes the information set starting from the determined first message instance and ending with a received message instance comprising a stop bit indicating the end of the information set. The method then comprises collecting the information set from the identified set of message instances.

In a third aspect, there is provided a mobile station configured to perform, when connected to a first radio access network of a first radio access technology, acquisition of an information set related to a second radio access network of a second different radio access technology for enabling mobility to the second radio access network. The mobile station is configured to receive message instances, wherein a set of the message instances includes the information set for enabling mobility to the second radio access network. The mobile station is configured to investigate the message instances to find counter information in a message instance indicating the number of message instances the mobile station must acquire to assemble the information set. The mobile station is also configured to identify, in relation to the message instance in which the counter information is found, the set of message instances that includes the information set based on the counter information. The mobile station is configured to collect the information set from the identified set of message instances.

In a fourth aspect, there is provided a mobile station configured to perform, when connected to a first radio access network of a first radio access technology, acquisition of an information set related to a second radio access network of a second different radio access technology for enabling mobility to the second radio access network. The mobile station is configured to receive message instances, wherein a set of the message instances includes the information set for enabling mobility to the second radio access network. The mobile station is configured to investigate an index field, included in each message instance, to determine whether the received message instance is the first message instance and determine whether there is any information related to the second radio access network of a second different radio access technology in the first message instance to thereby determine the start of the information set. The mobile station is also configured to identify the set of message instances that includes the information set starting from the determined first message instance and ending with a received message instance comprising a stop bit indicating the end of the information set. The mobile station is configured to collect the information set from the identified set of message instances.

In a fifth aspect, there is provided a method, to be implemented on a network side, for preparing, for a mobile station connected to a first radio access network of a first radio access technology, an information set related to a second radio access network of a second different radio access technology for enabling mobility to the second radio access network. The method comprises preparing a set of message instances carrying the information set for enabling mobility to the second radio access network. The method further comprises introducing, in a specific of the message instances, counter information indicating the number of message instances the mobile station must acquire to assemble the information set.

In a sixth aspect, there is provided a method, to be implemented on a network side, for preparing, for a mobile station connected to a first radio access network of a first radio access technology, an information set related to a second radio access network of a second different radio access technology for enabling mobility to the second radio access network. The method comprises preparing a set of message instances carrying the information set for enabling mobility to the second radio access network by including information pertaining to the information set starting from a first message instance of a predetermined information message. The method further comprises excluding a start bit in the first message instance of the predetermined information message, while introducing a stop bit in the last of the message instances.

In a seventh aspect, there is provided a network device configured to prepare, for a mobile station connected to a first radio access network of a first radio access technology, an information set related to a second radio access network of a second different radio access technology for enabling mobility to the second radio access network. The device is configured to prepare a set of message instances carrying the information set for enabling mobility to the second radio access network. The device is also configured to introduce, in a specific of said message instances, counter information indicating the number of message instances the mobile station must acquire to assemble the information set.

In an eighth aspect, there is provided a network device configured to prepare, for a mobile station connected to a first radio access network of a first radio access technology, an information set related to a second radio access network of a second different radio access technology for enabling mobility to the second radio access network. The device is configured to prepare a set of message instances carrying the information set for enabling mobility to the second radio access network by including information pertaining to the information set starting from a first message instance of a predetermined information message. The device is also configured to exclude a start bit in the first message instance of the predetermined information message, while introducing a stop bit in the last of the message instances.

In a ninth aspect, there is provided a network node implemented on a network side of a communication network, wherein the network node comprises a network device according to the seventh or eighth aspect.

In a tenth aspect, there is provided a computer program for performing, when executed by a computer system, fast acquisition of an information set for a mobile station connected to a first radio access network of a first radio access technology, wherein the information set is related to a second radio access network of a second different radio access technology and enables mobility to the second radio access network. The computer program is configured to receive message instances as input, wherein a set of the message instances includes the information set for enabling mobility to the second radio access network. The computer program is also configured to investigate the message instances to find counter information in a message instance indicating the number of message instances required to assemble the information set. The computer program is configured to identify, in relation to the message instance in which the counter information is found, the set of message instances that includes the information set based on the counter information. The computer program is configured to collect the information set from the identified set of message instances.

In an eleventh aspect, there is provided a computer program for performing, when executed by a computer system, fast acquisition of an information set for a mobile station connected to a first radio access network of a first radio access technology. The information set is related to a second radio access network of a second different radio access technology and enables mobility to the second radio access network. The computer program is configured to receive message instances as input, wherein a set of the message instances includes the information set for enabling mobility to the second radio access network. The computer program is also configured to investigate an index field, included in each message instance, to determine whether the received message instance is the first message instance and determine whether there is any information related to the second radio access network of a second different radio access technology in the first message instance to thereby determine the start of the information set. The computer program is configured to identify the set of message instances that includes the information set starting from the determined first message instance and ending with a received message instance comprising a stop bit indicating the end of the information set. The computer program is configured to collect the information set from the identified set of message instances.

In a twelfth aspect, there is provided a computer program for preparing, when executed by a computer system, an information set for a mobile station connected to a first radio access network of a first radio access technology. The information set is related to a second radio access network of a second different radio access technology and enables mobility to the second radio access network. The computer program is configured to prepare message instances that includes the information set for enabling mobility to the second radio access network. The computer program is configured to introduce, in a particular message instance, counter information indicating the number of message instances the mobile station must acquire to assemble the information set.

In a thirteenth aspect, there is provided a computer program for preparing, when executed by a computer system, an information set for a mobile station connected to a first radio access network of a first radio access technology, wherein the information set is related to a second radio access network of a second different radio access technology and enables mobility to the second radio access network. The computer program is configured to prepare a set of message instances carrying the information set for enabling mobility to the second radio access network by including information pertaining to the information set starting from a first message instance of a predetermined information message. The computer program is also configured to exclude a start bit in the first message instance of the predetermined information message, while introducing a stop bit in the last of the message instances.

In this way, the overhead for enabling acquisition of system information can be reduced significantly and/or the time required for performing cell reselection to another radio access network of a different radio access technology. Thus the proposed technology will save capacity on the control channel(s) in the first radio access network, keeping in mind that such control channel capacity is often a very scarce resource.

Other advantages will be appreciated when reading the detailed description.

BRIEF DESCRIPTION OF DRAWINGS

The proposed technology, together with further objects and advantages thereof, may best be understood by making reference to the following description taken together with the accompanying drawings, in which:

FIG. 5 is a schematic diagram illustrating an example of an SI2quater message consisting of 5 instances while the 3 first instances contain UTRAN related information, i.e. the UTRAN Information Set.

FIG. 6 is a schematic diagram illustrating an example of an SI2quater message consisting of 5 instances while instance number 2, 3 and 4 contains UTRAN related information, i.e. the UTRAN Information Set, and instance number 4 contains counter information.

DETAILED DESCRIPTION

A basic idea is to introduce a new, more efficient in terms of the size of the overhead, method for acquisition, and especially the Fast Acquisition, of information such as system information or similar information, e.g. UTRAN related information.

Figure 1:
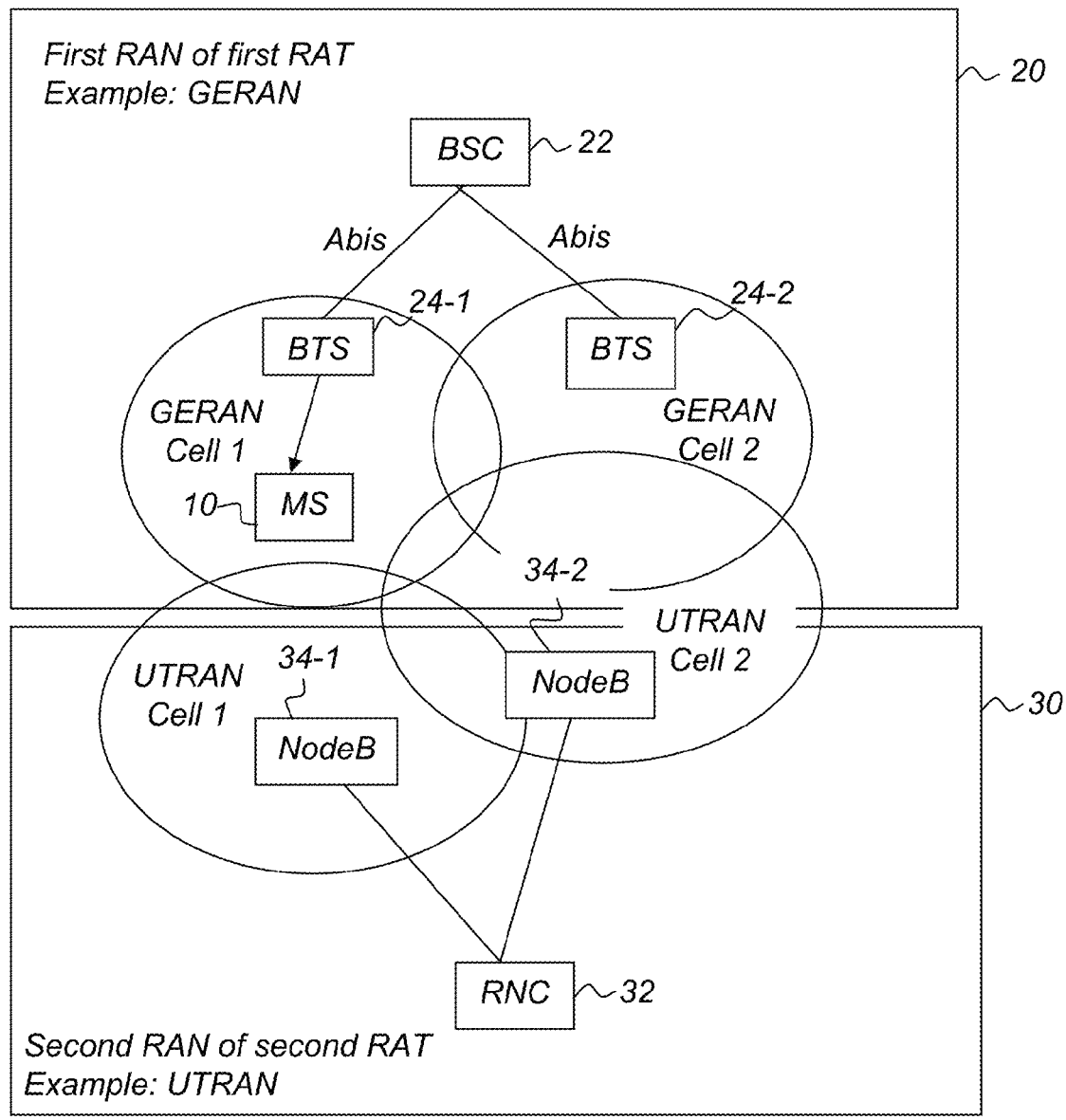
FIG. 1 is a schematic diagram illustrating an example of mobility between two different radio access technologies.
Figure 2:
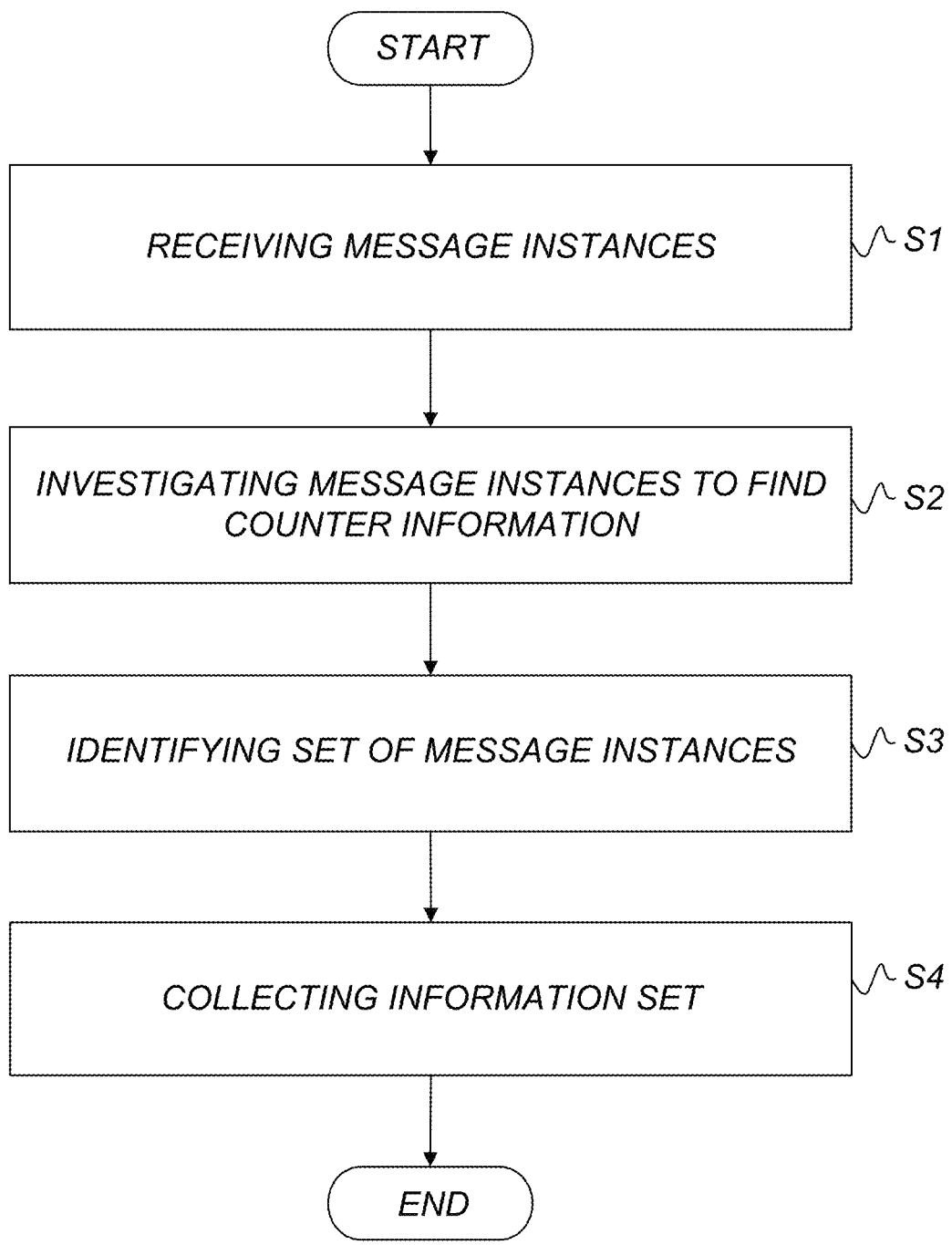
FIG. 2 is a schematic flow diagram illustrating an example of an information acquisition method to be executed by a mobile station to perform acquisition of an information set for enabling mobility to another radio access network of a different radio access technology.

FIG. 2 is a schematic flow diagram illustrating an example of an information acquisition method to be executed by a mobile station to perform acquisition of an information set for enabling mobility to another radio access network of a different radio access technology. Basically, the method allows a mobile station, connected to a first radio access network of a first radio access technology, to perform acquisition of an information set related to a second radio access network of a second different radio access technology for enabling mobility to the second radio access network. In step S1, the mobile station is receiving message instances, wherein a set of the message instances includes the information set for enabling mobility to the second radio access network. In step S2, the mobile station is investigating the message instances to find counter information in a message instance indicating the number of message instances the mobile station must acquire to assemble the information set. In step S3, the mobile station is identifying, in relation to the message instance in which the counter information is found, the set of message instances that includes the information set based on the counter information. In step S4, the mobile station is collecting the information set from the identified set of message instances.

In a particular example, the presence of the counter information is logically interpreted to mean that the message instance in which the counter information is found is the last message instance of said information set. In this case, the identifying step S3 includes identifying the set of message instances that includes the information set as being the last message instance together with a number of previous message instances, according to the counter information. By way of example, the collecting step S4 includes collecting the information set from a number of consecutive message instances as indicated by the counter information.

Typically, the message instances may be message instances of a System Information message or a Measurement Information message.

As an example, the acquisition is based on the 3GPP Fast Acquisition of System Information procedure, and the information set for enabling mobility to the second radio access network includes Universal Terrestrial Radio Access Network, UTRAN or Evolved Universal Terrestrial Radio Access Network, E-UTRAN, related information.

It should be understood that the proposed technology is generally applicable to a situation where a mobile station connected to a first radio access network of a first Radio Access Technology (RAT) needs to acquire information related to a second radio access network of a second RAT for enabling mobility to the second radio access network. In a specific, non-limiting example, the first radio access network is a GSM/EDGE Radio Access Network, GERAN, and the second radio access network is a Universal Terrestrial Radio Access Network, UTRAN or an Evolved Universal Terrestrial Radio Access Network, E-UTRAN. The information set is then preferably a UTRAN Information Set or an E-UTRAN Information Set.

On the network side of the communication network, there is provided a corresponding method for preparing, for a mobile station connected to a first radio access network of a first radio access technology, the information set related to the second radio access network of a second radio access technology for enabling mobility to the second radio access network. An example of such a method to be implemented on the network side is illustrated in FIG. 4A.

Figure 4A:
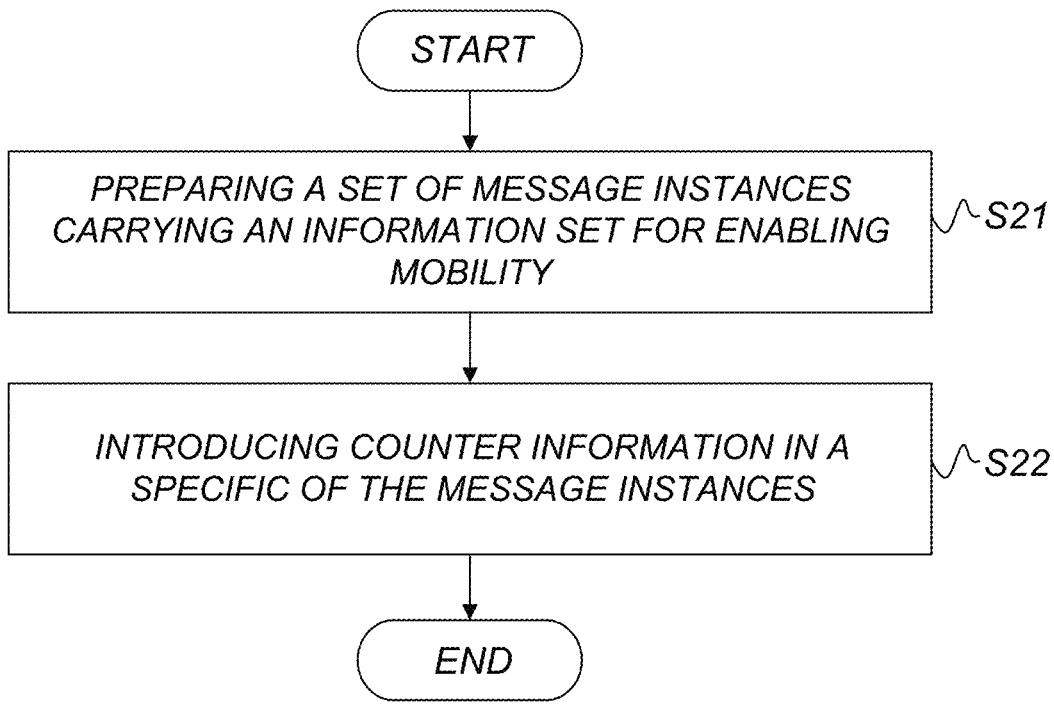
FIG. 4A is a schematic flow diagram illustrating an example of a method, to be implemented on the network side, for preparing, for a mobile station, an information set for enabling mobility to another radio access network of a different radio access technology.

FIG. 4A is a schematic flow diagram illustrating an example of a method, to be implemented on the network side, for preparing, for a mobile station, an information set for enabling mobility to another radio access network of a different radio access technology. In step S21, the network side is preparing a set of message instances carrying the information set for enabling mobility to the second radio access network.

In step S22, the network side is introducing, in a specific message instance, counter information indicating the number of message instances the mobile station must acquire to assemble the information set.

In a particular example, the introducing step S22 includes introducing the counter information in the last of the message instances carrying information pertaining to the information set for enabling mobility to the second radio access network.

By way of example, the preparing step S21 includes preparing message instances of a System Information message or a Measurement Information message.

As an example, the preparing step S21 includes preparing an information set that includes Universal Terrestrial Radio Access Network, UTRAN or Evolved Universal Terrestrial Radio Access Network, E-UTRAN, related information. The information set is then preferably a UTRAN Information Set or an E-UTRAN Information Set.

Figure 3:
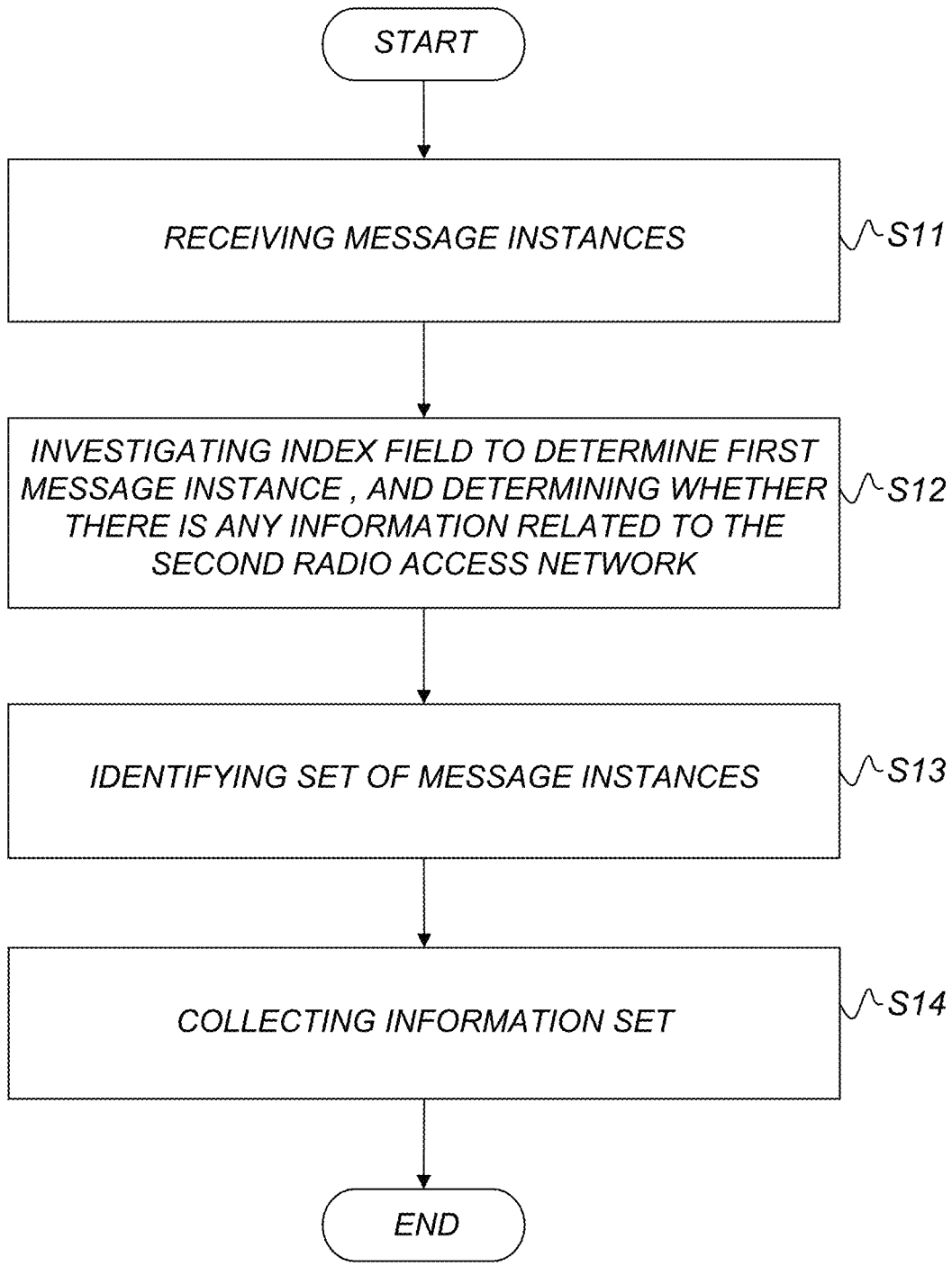
FIG. 3 is a schematic flow diagram illustrating an alternative example of an information acquisition method to be executed by a mobile station to perform acquisition of an information set for enabling mobility to another radio access network of a different radio access technology.

FIG. 3 is a schematic flow diagram illustrating an alternative example of an information acquisition method to be executed by a mobile station to perform acquisition of an information set for enabling mobility to another radio access network of a different radio access technology. Similarly to the method of FIG. 2, the method of FIG. 3 allows a mobile station, connected to a first radio access network of a first radio access technology, to perform acquisition of an information set related to a second radio access network of a second radio access technology for enabling mobility to the second radio access network. In step S11, the mobile station is receiving message instances, wherein a set of said message instances includes the information set for enabling mobility to the second radio access network. In step S12, the mobile station is investigating an index field, included in each message instance, to determine whether the received message instance is the first message instance and determining whether there is any information related to the second radio access network of a second different radio access technology in the first message instance to thereby determine the start of the information set. In step S13, the mobile station is identifying the set of message instances that includes the information set starting from the determined first message instance and ending with a received message instance comprising a stop bit indicating the end of the information set. In step S14, the mobile station is collecting the information set from the identified set of message instances.

As an example, the acquisition is based on the 3GPP Fast Acquisition of System Information procedure, and the information set for enabling mobility to the second radio access network includes Universal Terrestrial Radio Access Network, UTRAN or Evolved Universal Terrestrial Radio Access Network, E-UTRAN, related information. The information set is then preferably a UTRAN Information Set or an E-UTRAN Information Set.

For example, the message instances may be message instances of a System Information message or a Measurement Information message.

On the network side of the communication network, there is provided a corresponding method for preparing, for a mobile station connected to a first radio access network of a first radio access technology, the information set. An example of such a method to be implemented on the network side is illustrated in FIG. 4B.

Figure 4B:
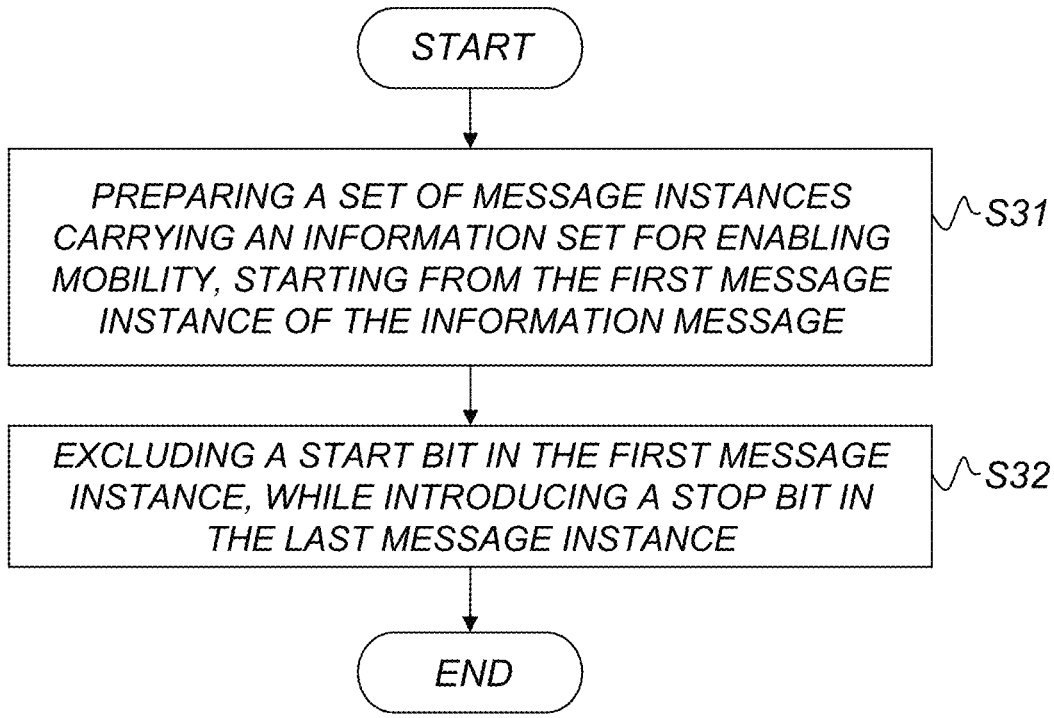
FIG. 4B is a schematic flow diagram illustrating an alternative example of a method, to be implemented on the network side, for preparing, for a mobile station, an information set for enabling mobility to another radio access network of a different radio access technology.

FIG. 4B is a schematic flow diagram illustrating an alternative example of a method, to be implemented on the network side, for preparing, for a mobile station, an information set for enabling mobility to another radio access network of a different radio access technology. In step S31, the network side is preparing a set of message instances carrying the information set for enabling mobility to the second radio access network by including information pertaining to the information set starting from a first message instance of a predetermined information message. In step S32, the network side is excluding a start bit in the first message instance of the predetermined information message, while introducing a stop bit in the last of the message instances.

The information set is preferably a UTRAN Information Set or an E-UTRAN Information Set.

For a better understanding, the proposed technology will now be explained with reference to a few non-limiting example solutions.

In a first example solution, the need for a Start bit is eliminated by including, on the network side, the UTRAN (E-UTRAN) related information, or similar information of a radio access network of another Radio Access Technology (RAT), starting from the first instance of the relevant System Information message such as the SI2quater message or from the first instance of the MEASUREMENT INFORMATION (MI) message.

The mobile station is configured to investigate the index field, included in each of the System Information message instances or in each instance of the MI message, to determine whether the present System Information message instance or the present MI message instance is in fact the first instance, and configured to determine whether there is any UTRAN (E-UTRAN) related information, or similar information of a radio access network of another RAT, in the first instance.

If it can be determined that the first instance of the System Information message or the first instance of the MI message also includes at least a part of the available UTRAN (E-UTRAN) related information, it can be concluded that this is the start of the UTRAN (E-UTRAN) related Information Set. In this way, the need for a Start bit can be eliminated.

In the first example solution, the legacy Stop bit is preferably kept.

In this way, a more efficient procedure for acquiring the complete UTRAN Information Set (respectively E-UTRAN Information Set), or similar Information Set of a radio access network of another RAT, is obtained.

In a second example solution, a new field element or information element is introduced in the last instance of the System Information message, such as the SI2quater message or in the last instance of the MEASUREMENT INFORMATION message, carrying UTRAN (E-UTRAN) related information, or similar information of a radio access network of another RAT. This new field element or information element operates as a counter that indicates the number of instances carrying UTRAN (E-UTRAN) related information or similar information.

In this example the network side is configured to transmit the counter information in the last of the relevant System Information message instances or in the last of the relevant MI message instances carrying information pertaining to the UTRAN Information Set (respectively E-UTRAN Information Set), or similar Information Set of a radio access network of another RAT.

The mobile station is configured to investigate the relevant instances of the System Information message or the relevant instances of the MI message in order to find the counter information to determine the number of instances the mobile station must acquire to assemble the complete UTRAN Information Set (respectively E-UTRAN Information Set), or similar Information Set of a radio access network of another RAT. The presence of this new field element or information element logically means that this is the last instance of the System Information message (or the last instance of the MI message) that contains UTRAN (E-UTRAN) related information, or information related to a radio access network of another RAT, and the mobile station must then collect the UTRAN (E-UTRAN) related information (or information related to a radio access network of another RAT) from the last message instance and a number of previous message instances according to the counter value. In this context it can be noted that according to the current standard the UTRAN (E-UTRAN) related information must be transmitted in consecutive instances. This current requirement enables the possibility to simply collect the number of consecutive instances as indicated in the counter field, i.e. there is no risk that some information may be missed.

As to the expression "instance" or "message instance", please note that a given System Information message or a given MI message may be of larger size in number of octets than the amount of payload octets that can be transferred over the radio interface in a single radio block used for transfer of a System Information message or a MI message. The portion of the System Information message (or MI message) that is transferred in a single radio block is normally designated as an instance of that System Information message (or MI message) and identified by a unique index value.

The present technology will now mainly be discussed in relation to a particular, non-limiting example, namely the SI2quater message and UTRAN (E-UTRAN) related information. However, the present technology is not limited thereto, and the same or similar problems and the same basic concepts are also valid for other System Information messages as well as for the MEASUREMENT INFORMATION message, or similar System Information messages or Measurement Information messages transmitted in other RATs.

A first example solution is to have "a fixed starting point", i.e. the network is always including the UTRAN (E-UTRAN) related information (3G Neighbour Cell Description and 3G Measurement Parameters Description or E-UTRAN Parameters Description) starting from the first instance of the SI2quater message, hence eliminating the need for a Start bit.

This is possible since a mobile station would understand from the SI2quater_INDEX field, included in each instance of the SI2quater message (see FIG. 5), that the present instance is in fact the first instance of the SI2quater message (SI2quater_INDEX=0) and which also contains at least a part of the available UTRAN (E-UTRAN) related information, hence this is the start of the UTRAN Information Set (respectively E-UTRAN Information Set). In other words, a mobile station could assume that if UTRAN (or E-UTRAN) related information is not found in the first instance of the SI2quater message then there is no UTRAN (E-UTRAN) information within the remaining instances of the SI2quater message (or fast acquisition of UTRAN (E-UTRAN) system information is not applied in this particular cell). It should though be understood that UTRAN (E-UTRAN) information can be excluded from the first instance of the message but included in other instances of the message but in that case, for this particular example solution, the Fast Acquisition procedure towards UTRAN (E-UTRAN) is not applied in the serving cell.

As in the legacy solution the network should provide UTRAN (E-UTRAN) related information in contiguous instances of the SI2quater message.

Furthermore, the network needs to introduce a Stop bit only in the last instance of the SI2quater message containing UTRAN (E-UTRAN) related information (3G Priority Parameter Description or E-UTRAN Parameters Description), i.e. according to the legacy solution.

FIG. 5 illustrates an example of an SI2quater message consisting of 5 instances while the 3 first instances contain UTRAN related information, i.e. the UTRAN Information Set. No UTRAN_Start bit is provided.

According to a second example solution, the existing 3G Priority Parameters Description Struct that contains the UTRAN_Start and the UTRAN_Stop bits is replaced with a new (optional) structure.

According to a first alternative of the second example solution, the new structure:

is decoupled from the 3G Priority Parameters Description in the Release-8 extension, i.e. it can be inserted without the need to repeat the UTRAN related Release-8 information.

contains a new field element indicating the number of SI2quater message instances containing UTRAN related information, i.e. 3G Neighbour Cell list, 3G measurement parameters and/or 3G priority information.

According to a second alternative of the second example solution, only the UTRAN_Start and UTRAN_Stop bits (respectively E-UTRAN_Start and E-UTRAN_Stop bits) in the 3G Priority Parameters Description struct (respectively E-UTRAN Parameters Description struct) is replaced with a new field element indicating the number of SI2quater message instances containing UTRAN (E-UTRAN) related information, i.e. the number of message instances in the UTRAN Information Set (respectively E-UTRAN Information Set).

In both alternatives the new field element can be seen as a counter that indicates the number of message instances (including the last message instance) that the MS/UE must acquire to assemble the complete UTRAN Information Set (respectively E-UTRAN Information Set).

The presence of this new field element logically means that this is the last instance of the SI2quater message that contains UTRAN (E-UTRAN) related information.

An example of this new field element is shown in FIG. 6. FIG. 6 illustrates an example of an SI2quater message consisting of 5 instances while instance number 2, 3 and 4 contains UTRAN related information, i.e. the UTRAN Information Set. UTRAN_NoOfSeg indicates the number of segments (or instances) in the UTRAN Information Set, hence eliminating the need for an UTRAN_Start bit.

In this particular example, since the SI2quater message may consist of up to 16 instances, a 4 bit field element is needed.

As in the legacy solution the network should provide the UTRAN (E-UTRAN) related information in contiguous instances of the SI2quater message, but not necessarily starting from the first instance of the SI2quater message (i.e. SI2quater_INDEX=0).

The proposed technology might save capacity on the control channel(s), such as the BCCH, to transmit system information to the MS. It shall be understood that in a mature system like GSM, BCCH capacity is a very scarce resource.

The procedures are normally defined in terms of messages exchanged over one or more control channels of the radio interface. Examples of such control channels are described in relevant parts of reference [2].

It will be appreciated that the procedures, methods and devices described above can be combined and re-arranged in a variety of ways, and that the proposed methods and procedures can be performed by one or more suitably programmed or configured digital signal processors and other known electronic circuits such as discrete logic gates interconnected to perform a specialized function, or application-specific integrated circuits.

Many aspects of the present technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device in which the present technology is implemented. It may also be possible to re-use existing software, e.g. by reprogramming of the existing software or by adding new software components.

Figure 7:
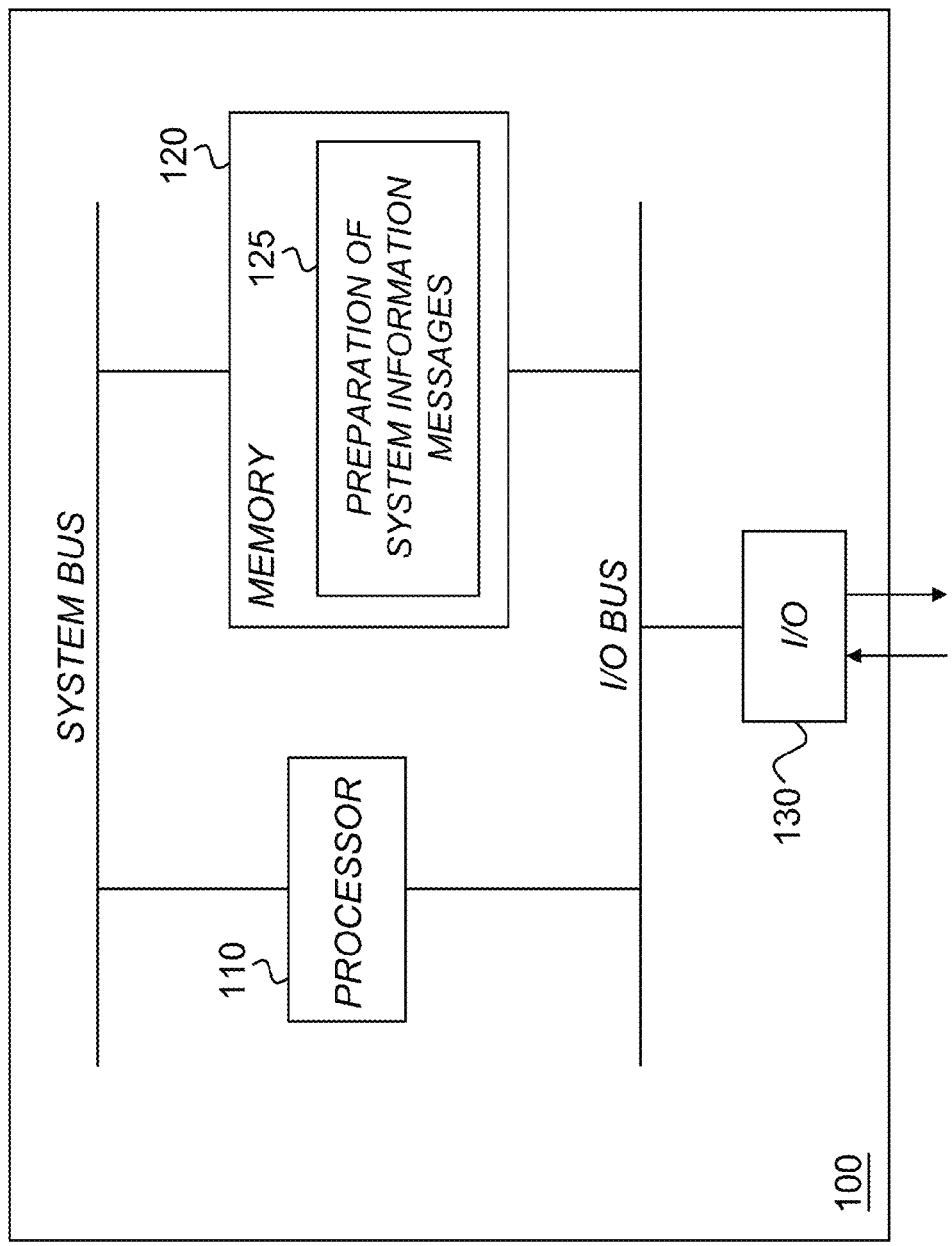
FIG. 7 is a schematic diagram illustrating an example of a computer-implementation for the network side.
Figure 9:
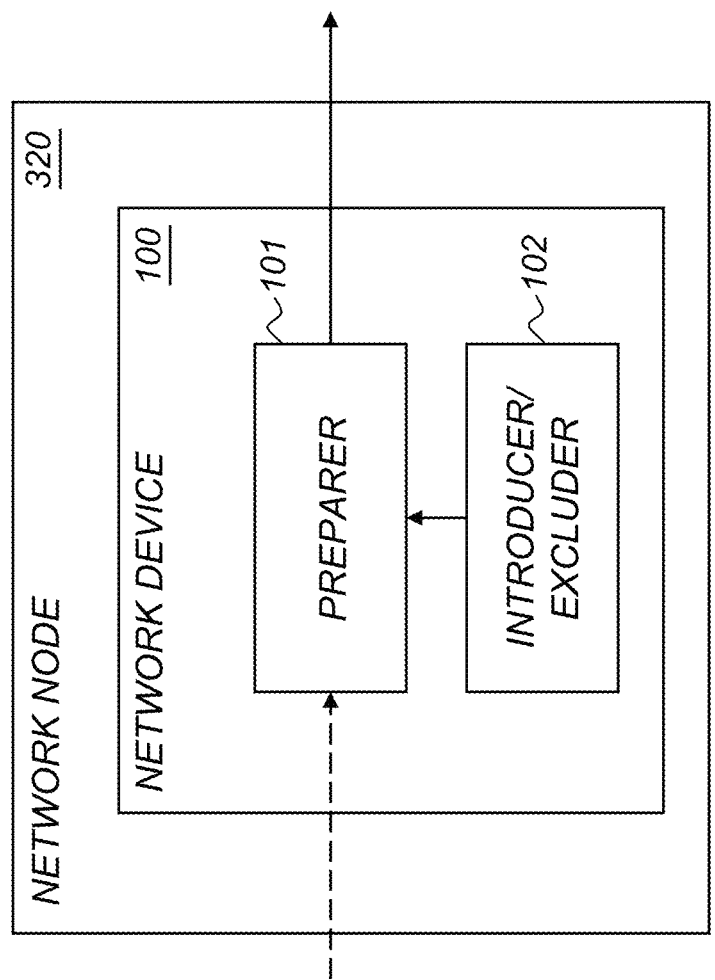
FIG. 9 is a schematic block diagram illustrating an example of a network device, which may be implemented in a network node.

The proposed technology provides a network device 100 for preparing an information set for a mobile station connected to a first radio access network of a first radio access technology, e.g. as illustrated in FIGS. 7 and 9.

The information set is related to a second radio access network of a second different radio access technology for enabling mobility to the second radio access network.

The device 100 is generally configured to prepare a set of message instances carrying said information set for enabling mobility to the second radio access network. In a particular example, the device 100 is configured to introduce, in a specific of the message instances, counter information indicating the number of message instances the mobile station must acquire to assemble the information set.

For example, the device 100 is configured to introduce the counter information in the last of the message instances carrying information pertaining to the information set for enabling mobility to the second radio access network.

By way of example, the device 100 is configured to prepare an information set that includes Universal Terrestrial Radio Access Network, UTRAN or Evolved Universal Terrestrial Radio Access Network, E-UTRAN, related information. This information set is preferably a UTRAN Information Set or an E-UTRAN Information Set.

In another alternative example, the device 100 is configured to prepare a set of message instances carrying the information set for enabling mobility to the second radio access network by including information pertaining to the information set starting from a first message instance of a predetermined information message. The device 100 is also configured to exclude a start bit in the first message instance of the predetermined information message, while introducing a stop bit in the last of the message instances.

In the above examples, the device 100 may be configured to prepare message instances of a System Information message or a Measurement Information message.

The information set is preferably a UTRAN Information Set or an E-UTRAN Information Set.

In the following, an example of a computer-implementation 100 for the network side will be described with reference to FIG. 7. This embodiment is based on a processor 110 such as a micro processor or digital signal processor, a memory 120 and an input/output (I/O) controller 130. In this particular example, at least some of the steps, functions and/or blocks described above are implemented in software, which is loaded into memory 120 for execution by the processor 110. The processor 110 and the memory 120 are interconnected to each other via a system bus to enable normal software execution. The I/O controller 130 may be interconnected to the processor 110 and/or memory 120 via an I/O bus to enable input and/or output of relevant data such as input parameter(s) and/or resulting output parameter(s).

In this particular example, the memory 120 includes a software component 125 implementing preparation of System Information message instances to enable improved fast acquisition of system information or similar information as described above. In particular, when executed by the processor 110, the software component 125 may effectuate the inclusion of UTRAN (E-UTRAN) information, or similar information of a radio access network of another RAT, starting from the first message instance of the System Information message(s) or from the first instance of the MEASUREMENT INFORMATION (MI) message(s) in accordance with the first example solution, or effectuate the introduction of counter information in a specific message instance (e.g. the last message instance) carrying information of the UTRAN Information Set (respectively E-UTRAN Information Set), or similar Information Set of a radio access network of another RAT, in accordance with the second example solution.

More generally, the software component 125 may be represented as a computer program for preparing, when executed by a computer system, an information set for a mobile station connected to a first radio access network of a first radio access technology. The information set is related to a second radio access network of a second different radio access technology and enables mobility to the second radio access network.

In a particular example, the computer program 125 is configured to prepare message instances that includes the information set for enabling mobility to the second radio access network, and configured to introduce, in a particular message instance, counter information indicating the number of message instances the mobile station must acquire to assemble the information set.

In another example, the computer program is configured to prepare a set of message instances carrying the information set for enabling mobility to the second radio access network by including information pertaining to the information set starting from a first message instance of a predetermined information message. The computer program is configured to exclude a start bit in the first message instance of the predetermined information message, while introducing a stop bit in the last of the message instances.

The computer-implementation 100 may for example be implemented on the network side, e.g. in a BSC that prepares and assembles the system information or similar information and/or in a BTS that transmits/broadcasts the system information message(s) or measurement information message(s) over the radio interface.

FIG. 9 is a schematic block diagram illustrating an example of a network device, which may be implemented in a network node. The network node is generally implemented on the network side of a communication network. The network node 320 may be any suitable network node, e.g. as exemplified above. The network node 320 includes a network device 100, which in turn basically includes a preparer 101, and an introducer/excluder 102. The preparer 101 is configured to prepare a set of message instances carrying an information set for enabling mobility. The introducer/excluder 102 is configured to introduce counter information in a specific message instance, such as the last message instance. Alternatively, the introducer/excluder 102 is configured to exclude a start bit in the first message instance, while introducing a stop bit in the last of the message instances. In this case, the preparer 101 is configured to include the information set starting from the first message instance.

Figure 8:
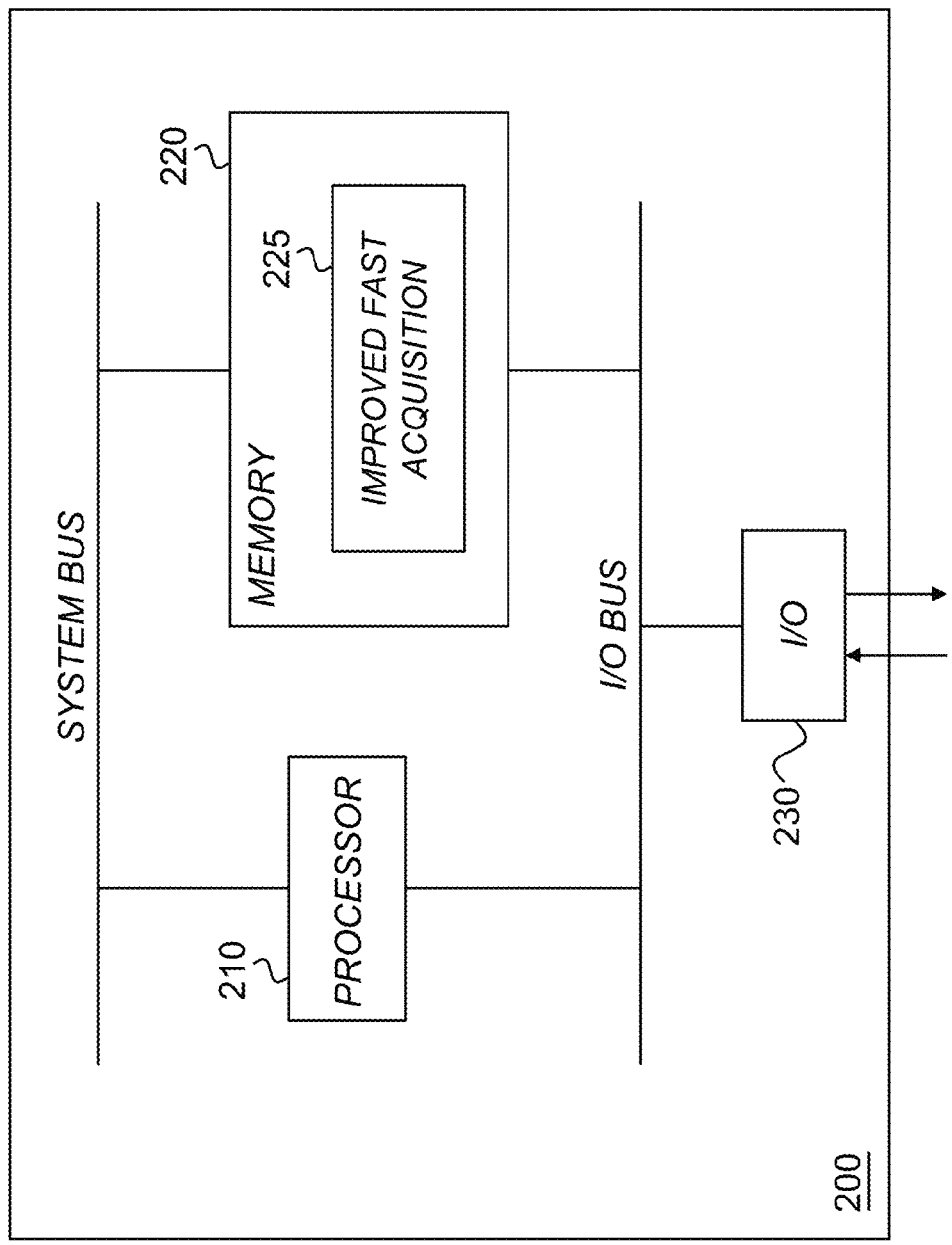
FIG. 8 is a schematic diagram illustrating an example of a computer-implementation for a mobile station.
Figure 10:
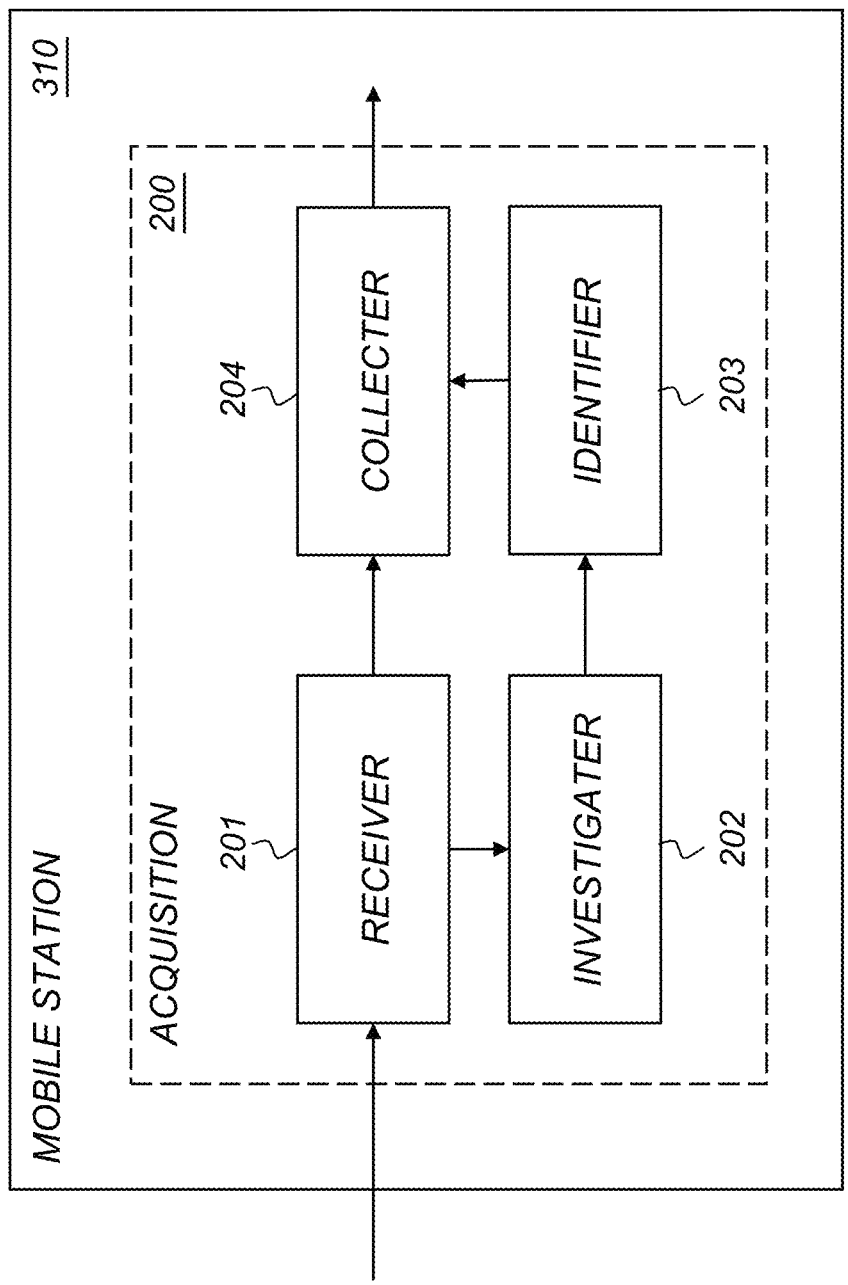
FIG. 10 is a schematic block diagram illustrating an example of a mobile station configured to perform acquisition of an information set for enabling mobility to another radio access network of a different radio access technology.

The proposed technology also provides a mobile station configured to perform acquisition of an information set, e.g. as illustrated in FIGS. 8 and 10.

The mobile station is typically connected to a first radio access network of a first radio access technology, and the information set to be acquired is related to a second radio access network of a second radio access technology for enabling mobility to the second radio access network.

In a particular example, the mobile station is configured to receive message instances, wherein a set of the message instances includes the information set for enabling mobility to the second radio access network. The mobile station is configured to investigate the message instances to find counter information in a message instance indicating the number of message instances the mobile station must acquire to assemble the information set. The mobile station is configured to identify, in relation to the message instance in which the counter information is found, the set of message instances that includes the information set based on the counter information. The mobile station is configured to collect the information set from the identified set of message instances.

By way of example, the mobile station is configured to logically interpret the message instance in which the counter information is found as the last message instance of the information set. In this case, the mobile station is configured to identify the set of message instances as being the last message instance together with a number of previous message instances, according to the counter information. The mobile station is normally configured to collect a number of consecutive message instances as indicated by the counter information.

The mobile station may, for example, be configured to perform the acquisition based on the 3GPP Fast Acquisition of System information procedure, and configured to acquire an information set that includes Universal Terrestrial Radio Access Network, UTRAN or Evolved Universal Terrestrial Radio Access Network, E-UTRAN, related information.

As an example, the mobile station is configured to be connected to a first radio access network in the form of a GSM/EDGE Radio Access Network, GERAN, and to acquire an information set related to a second radio access network in the form of a Universal Terrestrial Radio Access Network, UTRAN or an Evolved Universal Terrestrial Radio Access Network, E-UTRAN. The information set is then preferably a UTRAN Information Set or an E-UTRAN Information Set.

In an alternative example, the mobile station is configured to investigate an index field, included in each message instance, to determine whether the received message instance is the first message instance and determine whether there is any information related to the second radio access network of a second different radio access technology in the first message instance to thereby determine the start of the information set. The mobile station is then configured to identify the set of message instances that includes the information set starting from the determined first message instance and ending with a received message instance comprising a stop bit indicating the end of the information set. The mobile station is configured to collect the information set from the identified set of message instances.

In the above examples, the mobile station may be configured to receive message instances of a System Information message or a Measurement Information message.

Preferably, the mobile terminal is configured to acquire a UTRAN Information Set or an E-UTRAN Information Set.

In the following, an example of a computer-implementation 200 for a mobile station or user equipment will be described with reference to FIG. 8. This embodiment is based on a processor 210 such as a micro processor or digital signal processor, a memory 220 and an input/output (I/O) controller 230. In this particular example, at least some of the steps, functions and/or blocks described above are implemented in software, which is loaded into memory 220 for execution by the processor 210. The processor 210 and the memory 220 are interconnected to each other via a system bus to enable normal software execution. The I/O controller 230 may be interconnected to the processor 210 and/or memory 220 via an I/O bus to enable input and/or output of relevant data such as input parameter(s) and/or resulting output parameter(s).

In this particular example, the memory 220 includes a software component 225 implementing improved fast acquisition of information such as system information, as described above. When executed by the processor 210, fast acquisition of information is effectuated. In particular, the index field of the relevant System Information message instances or Measurement Information message instances is investigated to determine whether the present message instance is in fact the first message instance, and configured to determine whether there is any UTRAN (E-UTRAN) related information, or similar information of a radio access network of another RAT, in the first message instance, in accordance with the first example solution. Alternatively, the System Information message instances or Measurement Information message instances are investigated to find counter information regarding the number of message instances the mobile station must acquire to assemble the complete UTRAN (E-UTRAN) Information Set, or similar Information Set of a radio access network of another RAT. The presence of this new counter information logically means that this is the last instance of the System Information message or the last instance of the Measurement Information message that contains UTRAN (E-UTRAN) related information, or similar information of a radio access network of another RAT. The UTRAN (E-UTRAN) related information or similar information is then collected from the last message instance and a number of previous message instances according to the counter information.

More generally, the software component 225 may be represented as a computer program for performing, when executed by a computer system, fast acquisition of an information set for a mobile station connected to a first radio access network of a first radio access technology. The information set is related to a second radio access network of a second different radio access technology and enables mobility to the second radio access network.

In a particular example, the computer program 225 is configured to receive message instances as input, wherein a set of the message instances includes the information set for enabling mobility to the second radio access network. The computer program is also configured to investigate the message instances to find counter information in a message instance among the message instances indicating the number of message instances required to assemble the information set. The computer program is further configured to identify, in relation to the message instance in which the counter information is found, the set of message instances that includes the information set based on the counter information. The computer program is configured to collect the information set from the identified set of message instances.

In another example, the computer program 225 is configured to receive message instances as input, wherein a set of the message instances includes the information set for enabling mobility to the second radio access network. The computer program is further configured to investigate an index field, included in each message instance, to determine whether the received message instance is the first message instance and determine whether there is any information related to the second radio access network of a second different radio access technology in the first message instance to thereby determine the start of the information set. The computer program is also configured to identify the set of message instances that includes the information set starting from the determined first message instance and ending with a received message instance comprising a stop bit indicating the end of the information set. The computer program is configured to collect the information set from the identified set of message instances.

In the above computer-implementations, the information set is preferably, although not necessarily, a UTRAN Information Set or an E-UTRAN Information Set.

In general, software components or computer programs may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor.

The computer-implementation 200 may for example be implemented in a mobile station, or generally user equipment.

FIG. 10 is a schematic block diagram illustrating an example of a mobile station configured to perform acquisition of an information set for enabling mobility to another radio access network of a different radio access technology. The mobile station 310 includes circuitry 200 for acquisition of information. The acquisition circuitry 200 basically includes a receiver 201, an investigator 202, an identifier 203 and a collecter 204. The receiver 201 is configured to receive message instances. The investigator 202 is configured to investigate the message instances to find the counter information. Alternatively, the investigator 202 is configured to investigate an index field, included in each message instance, to determine whether the received message instance is the first message instance and determine whether there is any information related to the second radio access network of a second different radio access technology in the first message instance to thereby determine the start of the information set. The identifier 203 is configured to identify the set of message instances that includes the information set to be acquired. The collecter 204 is configured to collect the information set form the identified set of message instances.

Mobile stations or user equipment embodying the present technology includes, by way of example, mobile telephones, smart phones, pagers, advanced headsets, laptop computers and other mobile terminals, and the like.

The embodiments described above are to be understood as a few illustrative examples of the present technology. It will be understood by those skilled in the art that various modifications, combinations and changes may be made to the embodiments without departing from the scope of the present technology. In particular, different part solutions in the different embodiments can be combined in other configurations, where technically possible.

REFERENCES

[1] 3GPP TS 44.018, V10.2.0.
[2] 3GPP TS 44.003.

APPENDIX 1

TABLE 1

Encoding of the SI2quater Rest Octets IE including the 3G Priority Parameters Description structure.

```
< SI2quater Rest Octets > ::=
    < BA_IND : bit (1) >
    < 3G_BA_IND : bit (1) >
    < MP_CHANGE_MARK : bit (1) >
    < SI2quater_INDEX : bit (4) >
    < SI2quater_COUNT : bit (4) >
    { 0 | 1    < Measurement_Parameters Description : < Measurement Parameters Description struct >>
}
    { 0 | 1    < GPRS_Real Time Difference Description : < GPRS_Real Time Difference Description
struct >> }
    { 0 | 1    < GPRS_BSIC Description : GPRS_BSIC Description struct > }
    { 0 | 1    < GPRS_REPORT PRIORITY Description : < GPRS_REPORT_PRIORITY Description struct
>> }
    { 0 | 1    < GPRS_MEASUREMENT_Parameters Description :
                    < GPRS_MEASUREMENT Parameters Description struct >> }
    { 0 | 1    < NC Measurement Parameters : < NC Measurement Parameters struct >> }
    { 0 | 1    < extension length : bit (8) >
                    << bit (val(extension length)+1) > &
                    { < SI2q Extension Information > ! { Ignore: bit ** = <no string> } } > }
    { 0 | 1    < 3G Neighbour Cell Description : < 3G Neighbour Cell Description struct >> }
    { 0 | 1    < 3G Measurement Parameters Description : < 3G Measurement Parameters Description
struct >> }
    { 0 | 1    < GPRS_3G_MEASUREMENT Parameters Description :
                    < GPRS_3G MEASUREMENT Parameters Description struct >> }
    {          null    | L         -- Receiver compatible with earlier release
               | H                    -- Additions in Rel-5:
                    { 0 | 1    < 3G Additional Measurement Parameters Description :
                                    < 3G Additional Measurement Parameters Description struct >> }
                    { 0 | 1    < 3G ADDITIONAL MEASUREMENT Parameters Description 2 :
                                    < 3G ADDITIONAL MEASUREMENT Parameters Description 2
struct >> }
    { null    | L          -- Receiver compatible with earlier release
      | H                      -- Additions in Rel-6:
        < 3G_CCN_ACTIVE : bit (1) >
        {          null | L        -- Receiver compatible with earlier release
                   | H                 -- Additions in Rel-7:
                    { 0 | 1    < 700_REPORTING_OFFSET : bit (3) >
                                    < 700_REPORTING_THRESHOLD : bit (3) > }
                    { 0 | 1    < 810_REPORTING_OFFSET : bit (3) >
                                    < 810_REPORTING_THRESHOLD : bit (3) > }
                    {          null | L        -- Receiver compatible with earlier
```

TABLE 1-continued

Encoding of the SI2quater Rest Octets IE including the 3G Priority Parameters Description structure.

```
release
                                        | H                           -- Additions in Rel-8
                                        { 0 | 1    < Priority and E-UTRAN Parameters
Description :
                                                   < Priority and E-UTRAN
Parameters Description struct >> }
                                        { 0 | 1    < 3G CSG Description : < 3G CSG
Description struct >> }
                                        { 0 | 1    < E-UTRAN CSG Description : < E-
UTRAN CSG Description struct >> }
                                        {          null | L           -- Receiver compatible
with earlier release
                                        | H                           --
Additions in Rel-9
                                        { 0 | 1    < Enhanced Cell
Reselection Parameters Description :
                                                   < Enhanced
Cell Reselection Parameters IE >> }
                                        { 0 | 1    < CSG Cells
Reporting Description :
                                                   < CSG Cells
Reporting Description struct >> }
                                        {          null | L           --
Receiver compatible with earlier release
                                        | H
       -- Additions in Rel-10
                                        { 0 | 1            <
INIT_PWR_RED : bit (1)> }
                                                 }
                                             }
                                         }
                                     }
    < spare padding > ;
< Priority and E-UTRAN Parameters Description struct > ::=
    { 0 | 1    < Serving Cell Priority Parameters Description :
                   < Serving Cell Priority Parameters Description struct >> }
    { 0 | 1    < 3G Priority Parameters Description :
                   < 3G Priority Parameters Description struct >> }
    { 0 | 1    < E-UTRAN Parameters Description :
                   < E-UTRAN Parameters Description struct >> } ;
< 3G Priority Parameters Description struct > ::=
    < UTRAN_Start : bit >
    < UTRAN_Stop : bit >
    { 0 | 1    < DEFAULT_UTRAN_PRIORITY : bit(3) >
               < DEFAULT_THRESH_UTRAN: bit(5) >
               < DEFAULT_UTRAN_QRXLEVMIN: bit(5) > }
    { 1 < Repeated UTRAN Priority Parameters : < Repeated UTRAN Priority Parameters struct >> } ** 0 ;
```

The invention claimed is:

1. An information acquisition method to be executed by a mobile station, connected to a first radio access network of a first radio access technology, to perform acquisition of an information set related to a second radio access network of a second different radio access technology for enabling mobility to the second radio access network, said method comprising the steps of:

receiving message instances, wherein a set of said message instances includes said information set for enabling mobility to the second radio access network;

investigating said message instances to find counter information in a message instance among said message instances indicating the number of message instances the mobile station must acquire to assemble said information set, wherein the presence of said counter information logically means that the message instance in which said counter information is found is the last message instance of said information set;

identifying, in relation to the message instance in which said counter information is found, said set of message instances that includes said information set based on said counter information, wherein said set of message instances is identified as the last message instance and a number of previous message instances according to said counter information; and collecting said information set from the identified set of message instances.

2. The method of claim 1, wherein said step of collecting includes the step of collecting said information set from a number of consecutive message instances as indicated by said counter information.

3. The method of claim 1, wherein said message instances are message instances of a System Information message or a Measurement Information message.

4. The method of claim 1, wherein said acquisition is based on the 3GPP Fast Acquisition of System Information procedure, and said information set for enabling mobility to the second radio access network includes Universal Terrestrial Radio Access Network, UTRAN or Evolved Universal Terrestrial Radio Access Network, E-UTRAN, related information.

5. The method of claim 1, wherein said first radio access network is a GSM/EDGE Radio Access Network, GERAN, and said second radio access network is a Universal Terrestrial Radio Access Network, UTRAN or an Evolved Universal Terrestrial Radio Access Network, E-UTRAN, and said information set is a Universal Terrestrial Radio Access Network, UTRAN, Information Set or an Evolved Universal Terrestrial Radio Access Network, E-UTRAN, Information Set.

6. An information acquisition method to be executed by a mobile station, connected to a first radio access network of a first radio access technology, to perform acquisition of an information set related to a second radio access network of a second different radio access technology for enabling mobility to the second radio access network, said method comprising the steps of:

receiving SI2quater message instances, wherein a set of said message instances includes said information set for enabling mobility to the second radio access network;

investigating an SI2quater_INDEX field, included in each SI2quater message instance, to determine whether the received message instance is the first message instance and determining whether there is any information related to said second radio access network of a second different radio access technology in the first message instance to thereby determine the start of said information set, thus eliminating the need for a Start bit;

identifying said set of message instances that includes said information set starting from the determined first message instance and ending with a received message instance comprising a stop bit indicating the end of said information set; and collecting said information set from the identified set of message instances.

7. The method of claim 6, wherein said message instances are message instances of a System Information message or a Measurement Information message.

8. The method of claim 6, wherein said information set is a Universal Terrestrial Radio Access Network, UTRAN, Information Set or an Evolved Universal Terrestrial Radio Access Network, E-UTRAN, Information Set.

9. A mobile station configured to perform, when connected to a first radio access network of a first radio access technology, acquisition of an information set related to a second radio access network of a second different radio access technology for enabling mobility to the second radio access network, wherein said mobile station is configured to receive message instances, wherein a set of said message instances includes said information set for enabling mobility to the second radio access network;

wherein said mobile station is configured to investigate said message instances to find counter information in a message instance among said message instances indicating the number of message instances the mobile station must acquire to assemble said information set, wherein the presence of said counter information logically means that the message instance in which said counter information is found is the last message instance of said information set;

wherein said mobile station is configured to identify, in relation to the message instance in which said counter information is found, said set of message instances that includes said information set based on said counter information, wherein said mobile station is configured to identify said set of message instances as the last message instance and a number of previous message instances according to said counter information; and wherein said mobile station is configured to collect said information set from the identified set of message instances.

10. The mobile station of claim 9, wherein said mobile station is configured to collect a number of consecutive message instances as indicated by said counter information.

11. The mobile station of claim 9, wherein said mobile station is configured to receive message instances of a System Information message or a Measurement Information message.

12. The mobile station of claim 9, wherein said mobile station is configured to perform said acquisition based on the 3GPP Fast Acquisition of System information procedure, and configured to acquire an information set that includes Universal Terrestrial Radio Access Network, UTRAN or Evolved Universal Terrestrial Radio Access Network, E-UTRAN, related information.

13. The mobile station of claim 9, wherein said mobile station is configured to be connected to a first radio access network in the form of a GSM/EDGE Radio Access Network, GERAN, and to acquire an information set related to a second radio access network in the form of a Universal Terrestrial Radio Access Network, UTRAN or an Evolved Universal Terrestrial Radio Access Network, E-UTRAN, wherein said information set is a Universal Terrestrial Radio Access Network, UTRAN, Information Set or an Evolved Universal Terrestrial Radio Access Network, E-UTRAN, Information Set.

14. A mobile station configured to perform, when connected to a first radio access network of a first radio access technology, acquisition of an information set related to a second radio access network of a second different radio access technology for enabling mobility to the second radio access network, wherein said mobile station is configured to receive SI2quater message instances, wherein a set of said message instances includes said information set for enabling mobility to the second radio access network;

wherein said mobile station is configured to investigate an SI2quater_INDEX field, included in each message instance, to determine whether the received SI2quater message instance is the first message instance and determine whether there is any information related to said second radio access network of a second different radio access technology in the first message instance to thereby determine the start of said information set, this eliminating the need for a Start bit;

wherein said mobile station is configured to identify said set of message instances that includes said information set starting from the determined first message instance and ending with a received message instance comprising a stop bit indicating the end of said information set; and wherein said mobile station is configured to collect said information set from the identified set of message instances.

15. The mobile station of claim 14, wherein said mobile station is configured to receive message instances of a System Information message or a Measurement Information message.

16. The mobile station of claim 14, wherein said mobile terminal is configured to acquire a Universal Terrestrial Radio Access Network, UTRAN, Information Set or an Evolved Universal Terrestrial Radio Access Network, E-UTRAN, Information Set.

17. A method, to be implemented on a network side, for preparing, for a mobile station connected to a first radio access network of a first radio access technology, an information set related to a second radio access network of a second different radio access technology for enabling mobility to the second radio access network, said method comprising the steps of:

preparing a set of message instances carrying said information set for enabling mobility to the second radio access network;

introducing, in a specific of said message instances, counter information indicating the number of message instances the mobile station must acquire to assemble said information set, wherein said counter information is introduced in the last of the message instances carrying information pertaining to said information set for enabling mobility to the second radio access network.

18. The method of claim 17, wherein said step of preparing a set of message instances includes the step of preparing message instances of a System Information message or a Measurement Information message.

19. The method of claim 17, wherein said step of preparing a set of message instances includes the step of preparing an information set that includes Universal Terrestrial Radio Access Network, UTRAN or Evolved Universal Terrestrial Radio Access Network, E-UTRAN, related information.

20. The method of claim 17, wherein said information set is a Universal Terrestrial Radio Access Network, UTRAN, Information Set or an Evolved Universal Terrestrial Radio Access Network, E-UTRAN, Information Set.

21. A method, to be implemented on a network side, for preparing, for a mobile station connected to a first radio access network of a first radio access technology, an information set related to a second radio access network of a second different radio access technology for enabling mobility to the second radio access network, said method comprising the steps of:

preparing a set of SI2quater message instances carrying said information set for enabling mobility to the second radio access network by including information pertaining to said information set starting from a first SI2quater message instance of a predetermined information message; and excluding a start bit in said first SI2quater message instance of the predetermined information message, while introducing a stop bit in the last of said SI2quater message instances.

22. The method of claim 21, wherein said information set is a Universal Terrestrial Radio Access Network, UTRAN, Information Set or an Evolved Universal Terrestrial Radio Access Network, E-UTRAN, Information Set.

23. A network device configured to prepare, for a mobile station connected to a first radio access network of a first radio access technology, an information set related to a second radio access network of a second different radio access technology for enabling mobility to the second radio access network, wherein said device is configured to prepare a set of message instances carrying said information set for enabling mobility to the second radio access network;

wherein said device is configured to introduce, in a specific of said message instances, counter information indicating the number of message instances the mobile station must acquire to assemble said information set; and wherein said device is configured to introduce said counter information in the last of the message instances carrying information pertaining to said information set for enabling mobility to the second radio access network.

24. The network device of claim 23, wherein said device is configured to prepare message instances of a System Information message or a Measurement Information message.

25. The network device of claim 23, wherein said device is configured to prepare an information set that includes Universal Terrestrial Radio Access Network, UTRAN or Evolved Universal Terrestrial Radio Access Network, E-UTRAN, related information.

26. The network device of claim 23, wherein said device is configured to prepare a Universal Terrestrial Radio Access Network, UTRAN, Information Set or an Evolved Universal Terrestrial Radio Access Network, E-UTRAN, Information Set.

27. A network node implemented on a network side of a communication network, said network node comprising a network device of claim 23.

28. A network device configured to prepare, for a mobile station connected to a first radio access network of a first radio access technology, an information set related to a second radio access network of a second different radio access technology for enabling mobility to the second radio access network, wherein said device is configured to prepare a set of message SI2quater instances carrying said information set for enabling mobility to the second radio access network by including information pertaining to said information set starting from a first SI2quater message instance of a predetermined information message; and wherein said device is configured to exclude a start bit in said first SI2quater message instance of the predetermined information message, while introducing a stop bit in the last of said SI2quater message instances.

29. The network device of claim 28, wherein said network device is configured to prepare a Universal Terrestrial Radio Access Network, UTRAN, Information Set or an Evolved Universal Terrestrial Radio Access Network, E-UTRAN, Information Set.

30. A computer program for performing, when executed by a computer system, fast acquisition of an information set for a mobile station connected to a first radio access network of a first radio access technology, wherein said information set is related to a second radio access network of a second different radio access technology and enables mobility to the second radio access network, wherein said computer program is configured to receive message instances as input, wherein a set of said message instances includes said information set for enabling mobility to the second radio access network;

wherein said computer program is configured to investigate said message instances to find counter information in a message instance among said message instances indicating the number of message instances required to assemble said information set, wherein the presence of said counter information logically means that the message instance in which said counter information is found is the last message instance of said information set;

wherein said computer program is configured to identify, in relation to the message instance in which said counter information is found, said set of message instances that includes said information set based on said counter information, wherein said computer program is configured to identify said set of message instances as the last message instance and a number of previous message instances according to said counter information;

wherein said computer program is configured to collect said information set from the identified set of message instances.

31. A computer program for performing, when executed by a computer system, fast acquisition of an information set for a mobile station connected to a first radio access network of a first radio access technology, wherein said information set is related to a second radio access network of a second different radio access technology and enables mobility to the second radio access network,
- wherein said computer program is configured to receive SI2quater message instances as input, wherein a set of said message instances includes said information set for enabling mobility to the second radio access network;
- wherein said computer program is configured to investigate an SI2quater_INDEX field, included in each SI2quater message instance, to determine whether the received message instance is the first message instance and determine whether there is any information related to said second radio access network of a second different radio access technology in the first message instance to thereby determine the start of said information set, this eliminating the need for a Start bit;
- wherein said computer program is configured to identify said set of message instances that includes said information set starting from the determined first message instance and ending with a received message instance comprising a stop bit indicating the end of said information set; and
- wherein said computer program is configured to collect said information set from the identified set of message instances.

32. A computer program for preparing, when executed by a computer system, an information set for a mobile station connected to a first radio access network of a first radio access technology, wherein said information set is related to a second radio access network of a second different radio access technology and enables mobility to the second radio access network,
- wherein said computer program is configured to prepare message instances that includes said information set for enabling mobility to the second radio access network;
- wherein said computer program is configured to introduce, in a particular message instance, counter information indicating the number of message instances the mobile station must acquire to assemble said information set; and
- wherein said computer program is configured to introduce said counter information in the last of message instances carrying information pertaining to said information set for enabling mobility to the second radio access network.

33. A computer program for preparing, when executed by a computer system, an information set for a mobile station connected to a first radio access network of a first radio access technology, wherein said information set is related to a second radio access network of a second different radio access technology and enables mobility to the second radio access network,
- wherein said computer program is configured to prepare a set of SI2quater message instances carrying said information set for enabling mobility to the second radio access network by including information pertaining to said information set starting from a first SI2quater message instance of a predetermined information message; and
- wherein said computer program is configured to exclude a start bit in said first SI2quater message instance of the predetermined information message, while introducing a stop bit in the last of said SI2quater message instances.

* * * * *

UNITED STATES PATENT AND TRADEMARK OFFICE
CERTIFICATE OF CORRECTION

PATENT NO. : 8,812,002 B2  
APPLICATION NO. : 13/520386  
DATED : August 19, 2014  
INVENTOR(S) : Molander et al.

Page 1 of 1

It is certified that error appears in the above-identified patent and that said Letters Patent is hereby corrected as shown below:

In the Claims

In Column 22, Line 46, in Claim 14, delete "this" and insert -- thus --, therefor.

In Column 25, Line 20, in Claim 31, delete "this" and insert -- thus --, therefor.

Signed and Sealed this
Twenty-first Day of April, 2015

Michelle K. Lee
*Director of the United States Patent and Trademark Office*